United States Patent [19]

Schroppel

[11] Patent Number: 5,249,761
[45] Date of Patent: Oct. 5, 1993

[54] SETTING DEVICE FOR A CONTROL SURFACE

[75] Inventor: Werner Schroppel, Wendelstein, Fed. Rep. of Germany

[73] Assignee: Diehl GmbH & Co., Nuremberg, Fed. Rep. of Germany

[21] Appl. No.: 951,155

[22] Filed: Sep. 25, 1992

[30] Foreign Application Priority Data

Oct. 29, 1991 [DE] Fed. Rep. of Germany ....... 4135557

[51] Int. Cl.$^5$ .............................................. F42B 10/62
[52] U.S. Cl. ................... 244/3.21; 244/75 R; 244/3.24; 244/3.27
[58] Field of Search ........ 244/3.21, 3.24–3.3, 244/75 R, 228; 74/89.15; 424.8 R; 192/141, 143

[56] References Cited

U.S. PATENT DOCUMENTS

| 857,551 | 6/1907 | Dillion | 192/141 |
|---|---|---|---|
| 2,714,822 | 8/1955 | Reeves | 192/141 |
| 2,944,437 | 7/1960 | Pickles | 192/141 |
| 3,774,462 | 11/1973 | Thompson | 74/89.15 |
| 4,651,584 | 3/1987 | Brieseck et al. | |
| 4,655,420 | 4/1987 | Spiroff | |
| 5,040,745 | 8/1991 | Oswald et al. | |
| 5,098,043 | 3/1992 | Arena | 244/75 R |

FOREIGN PATENT DOCUMENTS

| 0184704 | 6/1986 | European Pat. Off. | |
|---|---|---|---|
| 4009549 | 9/1991 | Fed. Rep. of Germany | 244/75 R |
| 4019482 | 1/1992 | Fed. Rep. of Germany | 244/3.24 |
| 891349 | 3/1944 | France | 244/228 |
| 168059 | 6/1990 | Japan | 74/89.15 |
| 2-17799 | 8/1990 | Japan | 244/3.24 |
| 99191 | 4/1991 | Japan | 244/3.21 |
| 481413 | 3/1938 | United Kingdom | 192/141 |
| 2240954 | 8/1991 | United Kingdom | |

OTHER PUBLICATIONS

British Search Report.
French Search Report.

*Primary Examiner*—Harold J. Tudor
*Attorney, Agent, or Firm*—Scully, Scott, Murphy & Presser

[57] ABSTRACT

A setting device for a control surface on an airborne body, including a follower nut supported on a spindle which is drivable by a drive motor for effectuating the displacement of a shaft of the control surface through a lever. The drive motor and the spindle are mounted so as to be pivotable about a pendulum axis which extends normal to the longitudinal axis of the spindle. The lever is pivotally connected to a follower axis of the follower nut.

6 Claims, 4 Drawing Sheets

SETTING DEVICE FOR A CONTROL SURFACE

BACKGROUND OF THE INVENTION

1. Field of the Invention

The present invention relates to a setting device for the control surface or rudder of an airborne body, including a spindle which is actuatable through a control or drive motor, on which spindle there is mounted a follower nut which is secured against rotation and which travels between two end stops, and through the intermediary of which a shaft of the control surface is pivotable by means of a lever about a setting axis.

2. Discussion of the Prior Art

In the specification of U.S. Pat. No. 5,040,745, which is assigned to the common assignee of this application, and the disclosure of which is incorporated herein by reference, there is disclosed a setting device for a control surface or rudder of the type considered herein. In the patent, it is intended to achieve a higher degree of efficiency in the drive train, in that the follower nut is guided within a sleeve which assumes load forces which are transmitted from the shaft of the control surface. This type of construction is expensive in view of the longitudinal or axial bearing required for the follower nut.

Moreover, in the above-mentioned patent, the guidance of the follower nut within the sleeve is expedient inasmuch as the nut engages through the use of a projection between a pair of fingers which are located on the shaft of the control surface. Thusly, the shape of a gear-tooth flank is provided at the juncture while; moreover, the juncture leads to tilting moments being encountered on the follower nut; with such moments having to be assumed by the guidance therefor. Such tilting moments, in principle, exert an adverse effect on the degree of efficiency.

SUMMARY OF THE INVENTION

Accordingly, an object of the present invention is to propose a setting device of the type as considered hereinabove, in which the degree of efficiency is improved; in particular, through avoiding the imposition of a tilting moment or torque on the follower nut.

In accordance with the invention, this object is attained for a setting device of the type as considered herein, in that the drive motor and the spindle are supported so as to be pivotable about a swing or pendulum axis which extends normally of the longitudinal axis of the spindle, and wherein a lever which is connected with the shaft to the control surface is articulated or hinged to a follower axis on the follower nut; and whereby the pendulum axis, the follower axis and the setting axis are arranged in a parallel relationship with each other.

Through this configuration, the degree of efficiency of the drive train is significantly improved inasmuch as no substantial tilting moment or torque is encountered at the follower nut. This is because the spindle and the drive motor freely follow the motion of the follower nut which is coupled to the setting axis, in that the spindle and the drive motor pivot about the pendulum axis. This has the consequence that any special support for the follower nut in the longitudinal direction becomes superfluous, so that fewer and simpler components are sufficient. From the foregoing there is also obtained a simplification in the assembly of parts and a reduction in the installation space required in the airborne body, as well as a saving in weight.

By means of the system with the three axes; in effect, the swing or pendulum axis, the follower axis and the setting axis, this of itself results in an extensive freedom from play since there is no need for the provision of slots and lug or projection-like connections. This reduces the requirement with regard to the maintenance of tolerances. Inasmuch as a surface contact is present in the region of the axes, the forces which are encountered in such a setting device, are readily transmittable without any particular difficulties.

BRIEF DESCRIPTION OF THE DRAWINGS

Advantageous embodiments of the invention will now become more readily apparent from the following description of an exemplary embodiment thereof, taken in conjunction with the accompanying drawings; in which.

DETAILED DESCRIPTION

Figure 1:
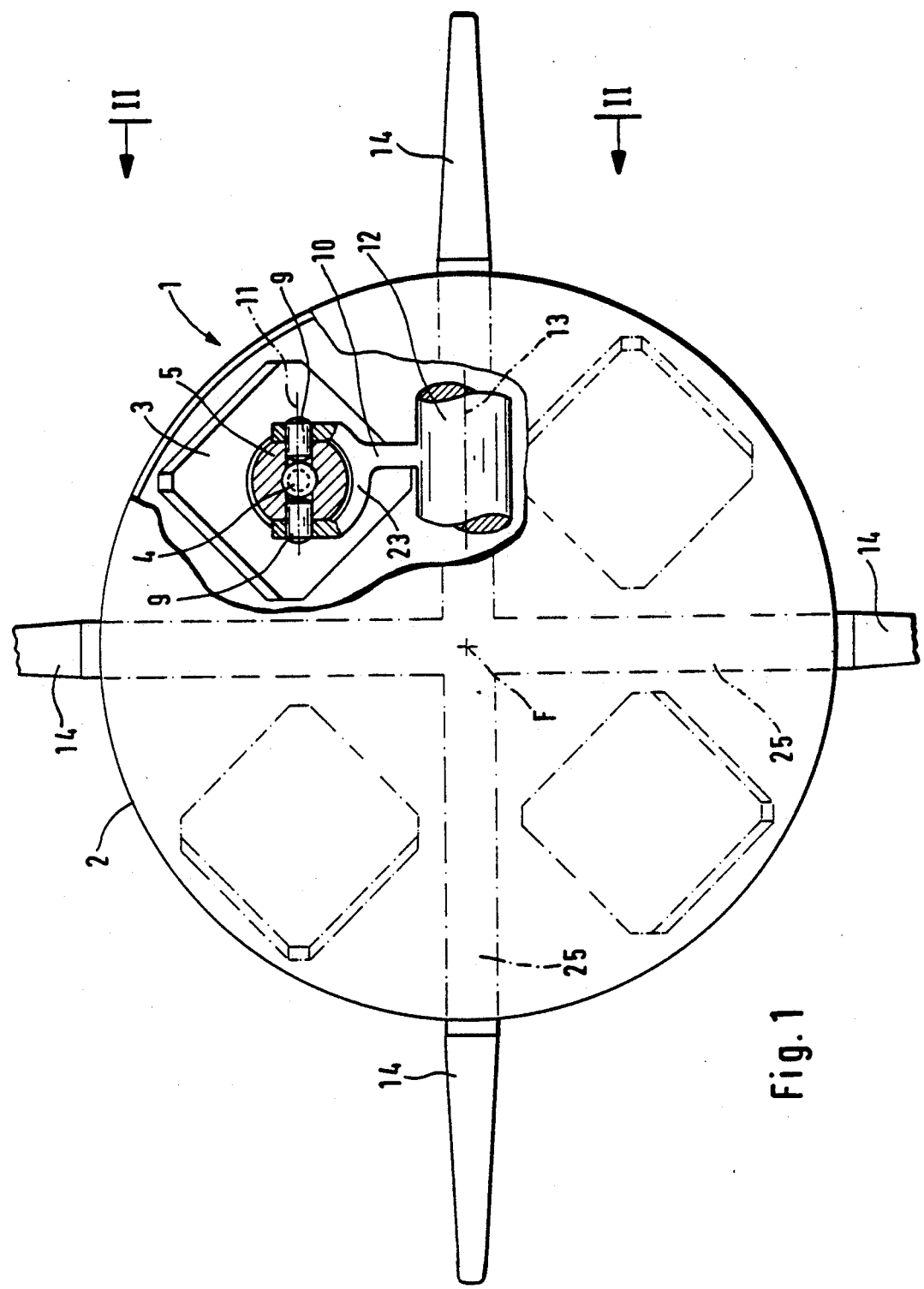
FIG. 1 illustrates a diagrammatic longitudinal view of an airborne body possessing four setting devices for control surfaces.

A setting device 1 for a control surface on an airborne body 2 possesses a drive motor 3. The drive motor 3 actuates a threaded spindle 4. A follower nut 5 is seated on the threaded spindle 4.

The drive motor 3, and consequently also the spindle 4, are pivotally supported on a swing or pendulum axis 6. For this purpose, the drive motor 3 is hereby arranged at the side thereof which is remote from the spindle 4 on a swing or pendulum bolt 7 which is fixedly arranged in the airborne body 2. The pendulum axis 6 intersects the drive axis or respectively, spindle axis 8.

A lever 10 is mounted on the follower nut 5 so as to bear against follower pins 9. The follower pins 9 lie on a follower axis 11 which intersects the spindle axis 8 and extends in parallel with the pendulum axis 6.

The lever 10 is fixed to a control surface shaft 12 which is mounted on the airborne body 2 so as to be pivotable about a setting axis 13. The control surface shaft 12 supports a control surface 14. The setting axis 13 extends in parallel with the follower axis 11 and the swing or pendulum axis 6.

Located on the spindle 4 are two end stops 15 and 16. These end stops respectively possess radial stop or contact surfaces 17 and 18 with which are respectively associated radial contact surfaces 19, 20 on the follower nut 5. The radial contact surfaces 17 through 20 ensure that the follower nut 5 will not axially clamp at the end stops 15 and 16 so as to be able to easily release itself from the end stops 15 and 16. The end stops 15 and 16 include guide projections 21, 22 which enter into the follower nut 5 when the latter moves into the regions of the respective end stops 15 and 16.

The lever 10 includes a crank-shaped or bend portion 23 as shown in FIG. 1.

Figure 2:
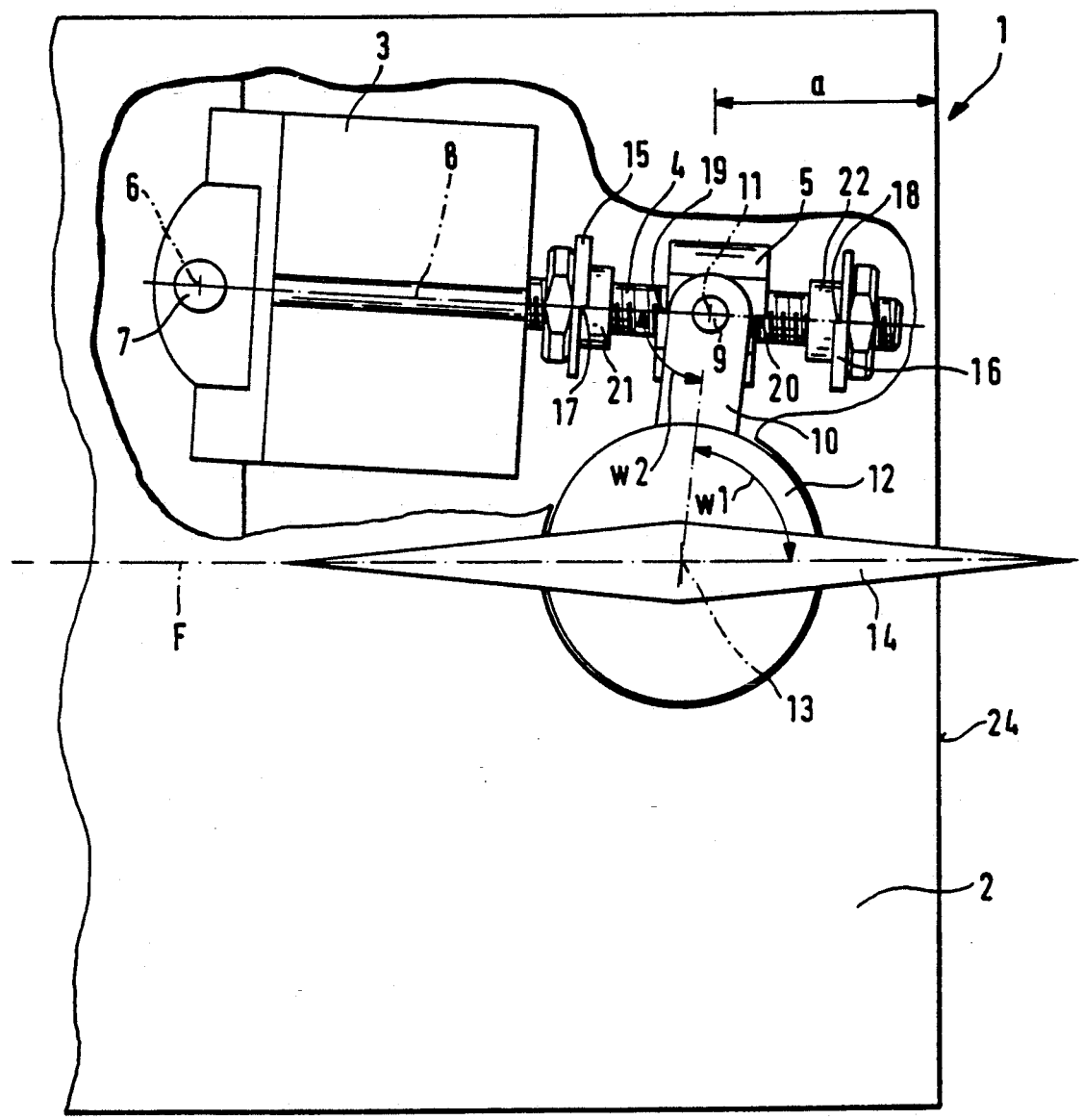
FIG. 2 illustrates, on an enlarged scale, a sectional view taken along line II-II in FIG. 1 of one of the setting devices for the control surfaces.

FIG. 2 illustrates the follower nut 5 in its central or middle position and, correspondingly, illustrates the control surface 14 in the inoperative position thereof in which there is no setting of the control surface 14 relative to the axis of flight F. In this middle position, the lever 10 extends at an acute angle w1 with respect to the axis or line of flight F. As a result thereof, the distance a of the follower nut 5 from the tail end 24 of the airborne body is smaller than in the instance in which the angle w1 subtends a right angle. Through this arrangement there is provided a compact and space-saving structure, since in this instance the drive motor 3 can be mounted more closely to the tail end 24 of the airborne body.

The longitudinal axis 8 of the spindle 4 is already at an acute angle relative to the line or axis of flight F in the middle position of the follower nut 5. The axis of flight F and the longitudinal axis 8 are therefore not in parallel in the middle position of the follower nut 5. The drive motor 3 is positioned towards the outside. The angle W2 between the lever 10 and the longitudinal axis 8 of the spindle thereby approaches a right angle when the follower nut 5 is in the middle position; and in any case, closer to a right angle w2 than the angle w1. That has the advantage that, commencing from the middle position, there is achieved a symmetrical transmission of force at both positive and negative setting angles for the control surface 14.

Figure 3:
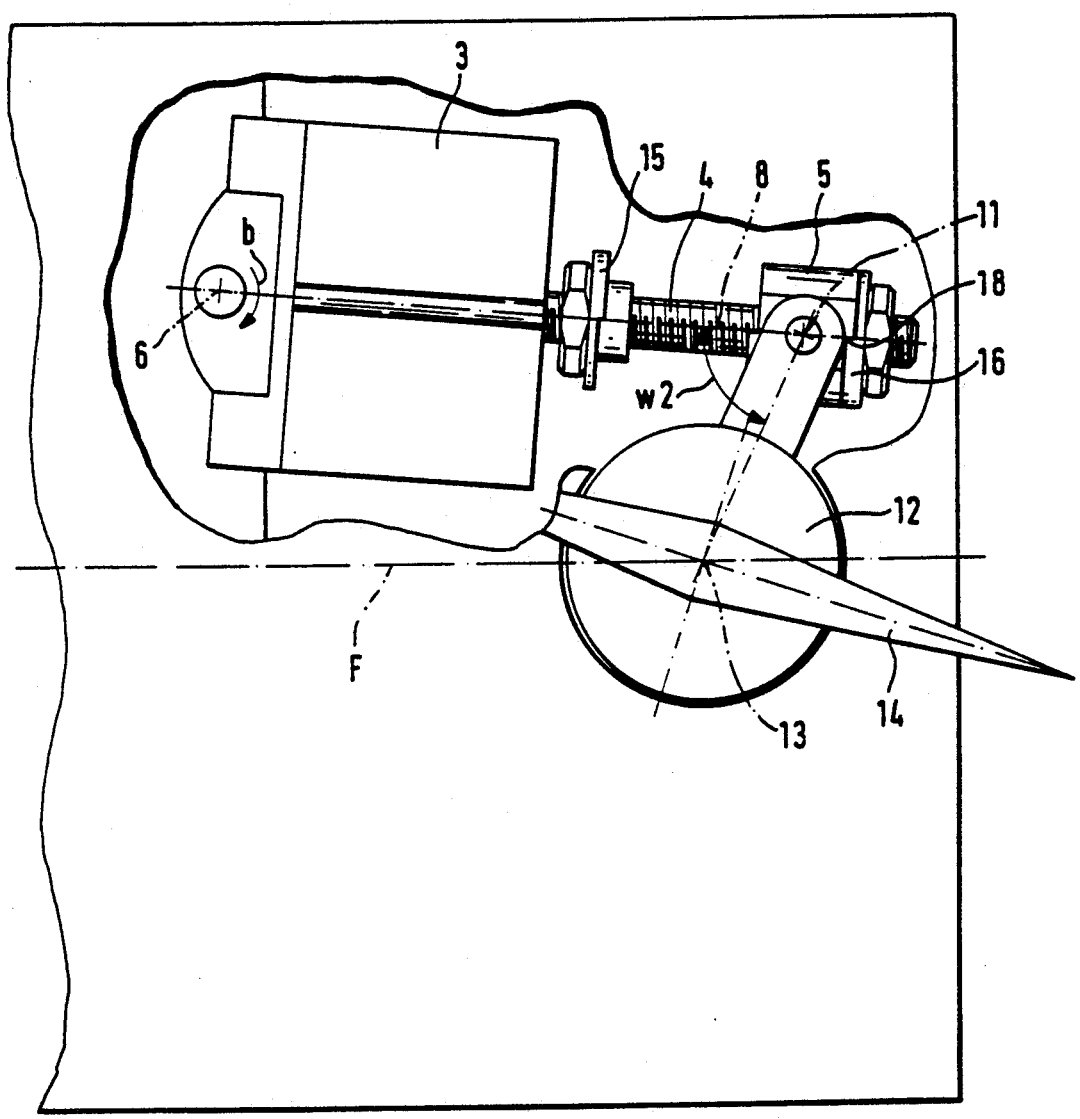
FIG. 3 illustrates the setting device in a rearward stop position.

FIG. 3 represents the control surface 14 in one of its condition of maximum deflection, in which the follower nut 5 bears against the contact surface 18 of the end stop 16. When the follower nut 5 is moved from the middle position towards the end stop 16 by the rotating spindle 4, then angle w2 is decreased. The drive motor 3 and the spindle 4 freely pivot about the swing or pendulum axis 6 in the direction indicated by the arrow b. During that movement they are guided by the follower nut 5.

Figure 4:
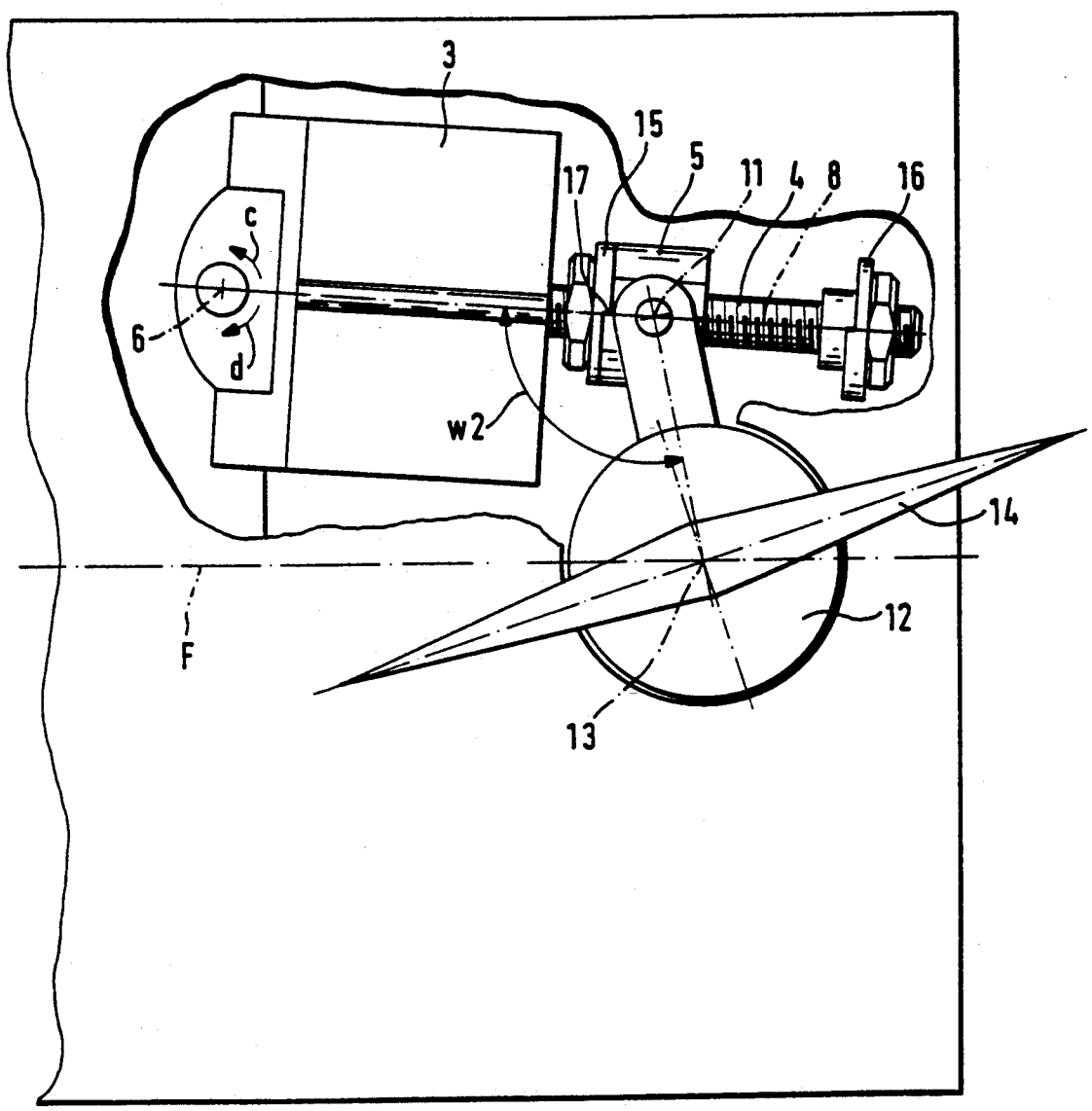
FIG. 4 illustrates the setting device in a forward stop position.

FIG. 4 illustrates the control surface in its other condition of maximum deflection, wherein the follower nut 5 bears against the contact surface 17 of the end stop 15. In this case, the angel w2 is larger than in the position shown in FIG. 2. At the movement of the follower nut 5 from the middle position towards the end stop 15, the drive motor 3, and thereby the spindle 4, are initially slightly pivoted about the pendulum axis 6 in the direction indicated by the arrow c, and then pivoted about the pendulum axis 6 in the direction indicated by the arrow d.

Each of the four illustrated control surfaces 14 of the airborne body 2 is actuatable through its own setting motor 3. The control surfaces 14 are retractable into retracting regions 5 on the airborne body 2, as shown in FIG. 1.

The tilting movement of the drive motor 3 about the pendulum axis 6 is comparatively slight. The transmission ratio and the drive moments at the control surface shaft 12 are hereby essentially linear in nature. The inertial effects of the drive motor 3 about the pendulum axis 6 are slit inasmuch as the distance between the pendulum axis 6 and the follower nut 5 is comparatively large and, consequently, the deflections remain small and the mass of the drive motor 3 concentrates near the pendulum axis 6.

The drive can also absorb comparatively intense lateral or sideways accelerations inasmuch as the drive motor 3 is supported at one side thereof on the swing bolt 7 and at the other side thereof by the follower nut 5. The drive motor 3 is therefore supported at both of its sides. This construction is advantageous since high lateral or sideways accelerations are encountered during a sideways ejection of the airborne body from a carrier.

What is claimed is:

1. A setting device for a control surface for an airborne body, said device comprising a spindle having a longitudinal axis; a drive motor for driving said spindle; a follower nut arranged on said spindle so as to be secured against rotation and being movable between two end stops, said follower nut actuating a lever for pivoting a shaft of the control surface about a setting axis; means for mounting said drive motor and said spindle for pivotable movement about a pendulum axis which extends normally to the longitudinal axis of the spindle, said lever which is operatively connected with the shaft of the control surface being articulated to a follower axis of the follower nut, said pendulum axis, follower axis and the setting axis being arranged to extend in parallel with each other, in a middle position of the follower nut between said end stops there being defined an acute angle between a line of flight of said airborne body and the lever which bears against the follower nut, the longitudinal axis of the spindle being inclined relative to the line of flight of said airborne body in the middle position of the follower nut between said end stops, and in the middle position of the follower nut an angle subtended between the longitudinal axis of the spindle and the lever being closer to 90° than the acute angle.

2. A setting device for a control surface control as claimed in claim 1, wherein said pendulum axis intersects the longitudinal axis of the spindle and an axis of the drive motor.

3. A setting device for a control surface as claimed in claim 1, wherein the pendulum axis is located at the side of the drive motor which is distant from the spindle.

4. A setting device for a control surface as claimed in claim 1, wherein the follower axis intersects the longitudinal axis of the spindle.

5. A setting device for a control surface as claimed in claim 1, wherein follower pins arranged in the follower axis inhibit said follower nut from rotating about the longitudinal axis of said spindle.

6. A setting device for a control surface as claimed in claim 1, wherein said end stops each have a radial stop surface for contacting radial contact surfaces on the follower nut.

* * * * *